Oct. 16, 1951 W. E. STILWELL, JR 2,571,170
TOGGLE SPRING
Filed Nov. 14, 1945 2 Sheets-Sheet 2
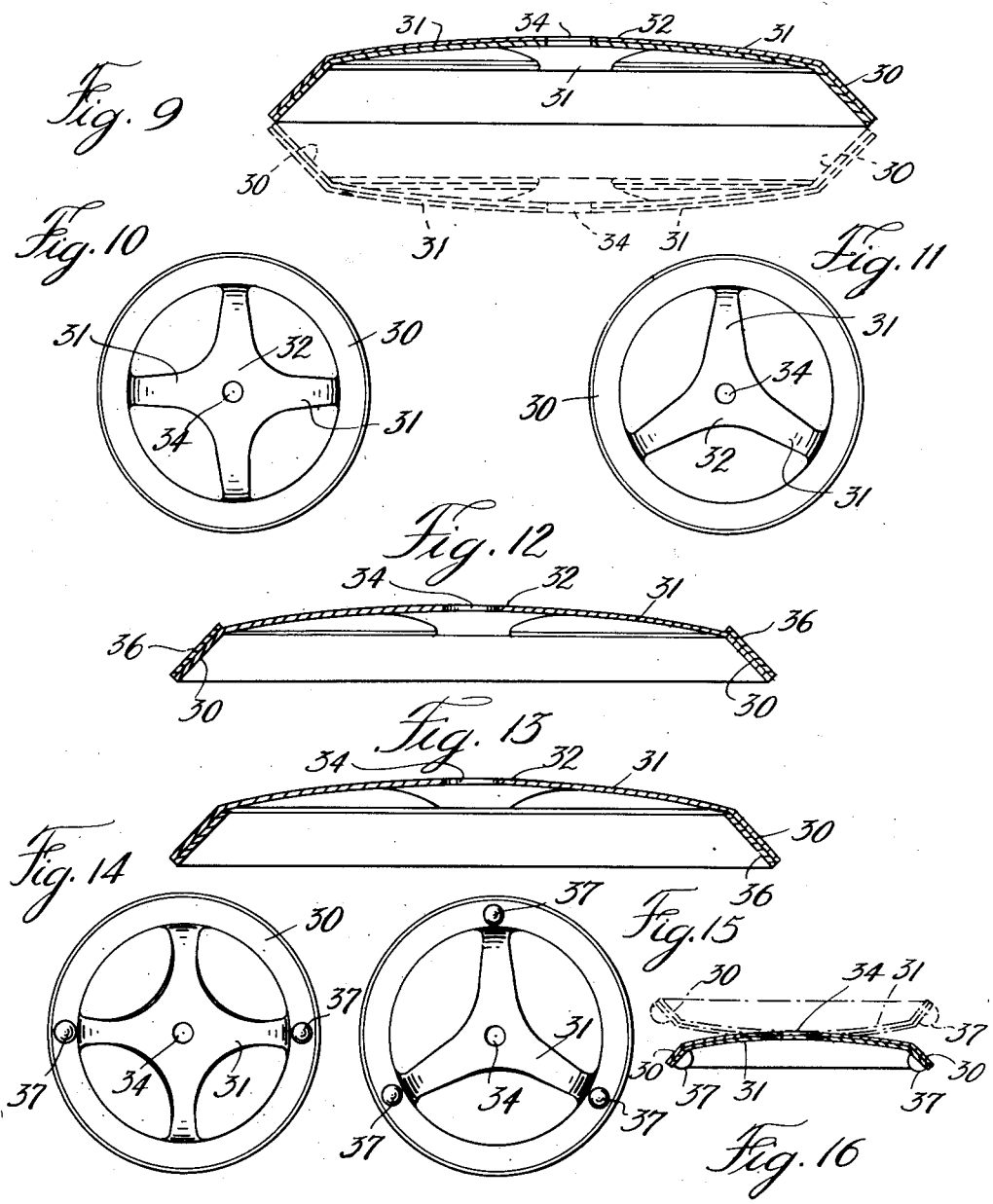
INVENTOR
WILLIAM E. STILWELL, JR.
BY
Henry J. Lucke
ATTORNEY Patented Oct. 16, 1951

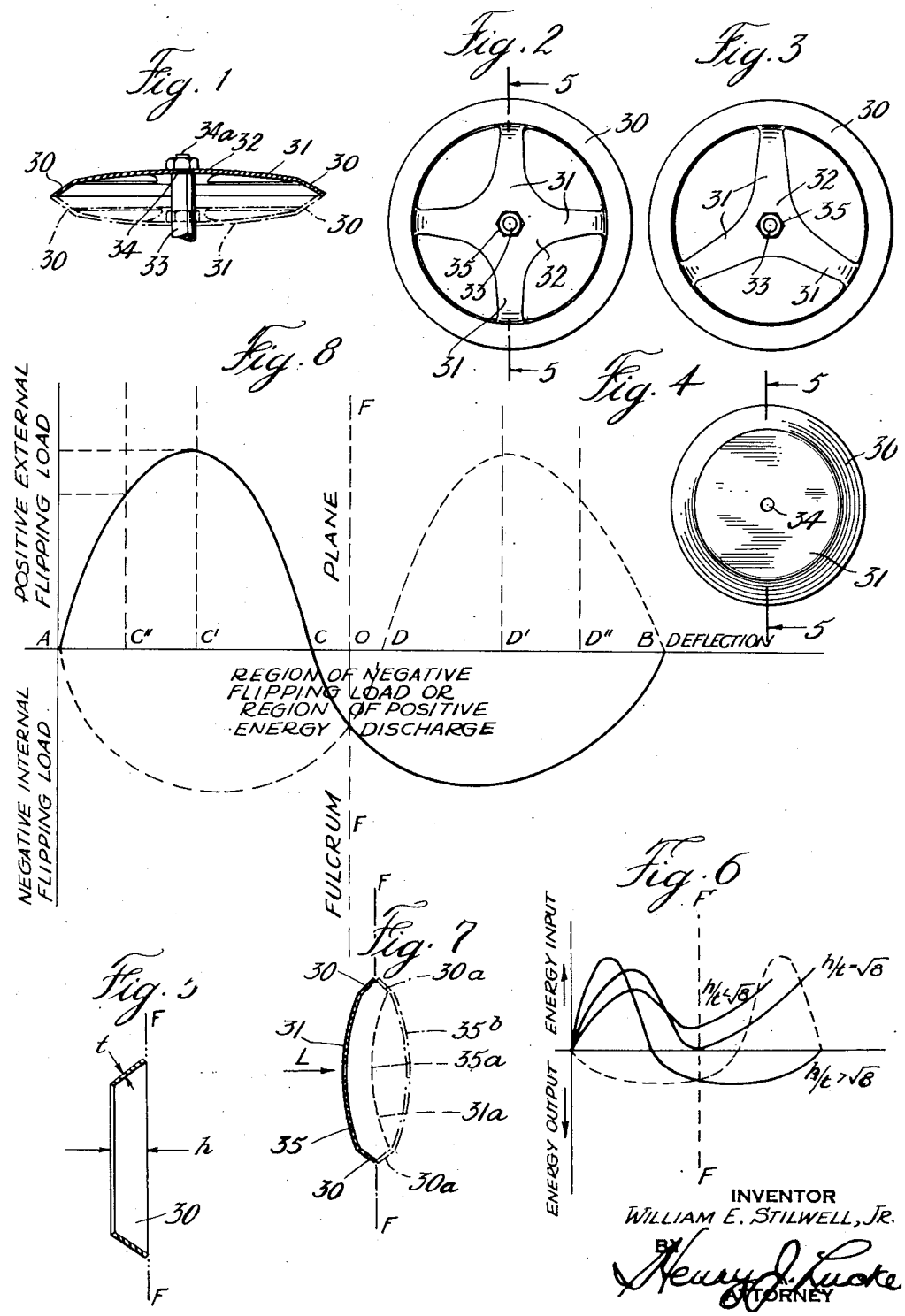

2,571,170

UNITED STATES PATENT OFFICE 2,571,170

TOGGLE SPRING

William Earle Stilwell, Jr., Glendale, Ohio, assignor to John B. Pierce Foundation, New York, N. Y., a corporation of New York Application November 14, 1945, Serial No. 628,447

11 Claims. (Cl. 297—15)

This invention relates to toggle springs.

This application is a continuation in part of my copending application, Serial No. 441,382, filed May 1, 1942, entitled "Toggle springs," now abandoned.

More particularly, the invention is directed to variant forms of toggle springs comprising two or more mutually connected spring systems.

Generally speaking, a toggle spring pursuant to the invention comprises a rim part and an inward part, the rim part and the inward part being formed and arranged relative to one another to embody the mutually connected systems.

The rim part and the inward part may have variant configurations. In many instances of practical applications of the invention developed to date, the rim is of circular configuration and the inward part integrally connected to the inward edge of the rim, the rim being shaped frusto-conically relative to the inward part.

A characteristic of toggle springs pursuant to the invention resides in the inward part being bowed elastically relative to the outer or rim part, as by effecting an elongation of the inward part relative to the rim part.

The rim may have a square or other polygonal configuration, and the inward part have a corresponding configuration.

Generally speaking, toggle springs embodying the invention may be formed of any suitable material susceptible to the stress-strain relationship normally associated with Hooke's law. Preferably, the toggle springs are formed of metal, usually spring metal, and most preferably of beryllium copper.

The inward part may be imperforate, but is preferably perforate, as by providing two or more legged portions extending from a central zone to the rim. The inward part may be of single material and integral with a rim of single material, or the inward part may be of two or more materials and the rim of two or more materials, or the inward part may be of single material and the rim of two or more materials.

In general, toggle springs pursuant to the invention embody a plurality of mutually connected spring systems comprising an outward frusto-conically extending rim part and the thereto connected inward part, the outward or rim part being arranged at an angle relative to a plane extending through the outer peripheral edge of the outward or rim part, the material of the inward part being bowed relative to the outward or rim part and/or elastically relative to the outward or rim part. Further, the two or more mutually connected spring systems comprised in the toggle spring possess different load-deflection characteristics controlled by the geometric configurations of the inward part and of the outward or rim part, by the coefficient of hardness of the outward or rim part relative to that of the inward part when metal is employed as the material of the stated parts, and by other factors set forth herein.

Further features and objects of the invention will be more fully understood from the following detail description and the accompanying drawings, in which:

Fig. 1 is a central sectional elevation of a preferred embodiment of the invention.

Fig. 2 is a plan view of Fig. 1.

Fig. 3 is a plan view of another preferred embodiment of the invention.

Fig. 4 is a plan view of another embodiment of the invention, having an imperforate inward part.

Fig. 5 is a central axial section on line 5—5 of Fig. 2 and Fig. 4, the inward part of the toggle spring being omitted.

Fig. 6 is a diagram of graphs of variant values of energy input and output with respect to variant positions of deflection of variant types of toggle springs pursuant to the invention.

Fig. 7 is a diagrammatic central section of the embodiments of Figs. 1 through 4 illustrating relative positions of the rim and inward part of a toggle spring for variant relative positions of its rim and inward part.

Fig. 8 is a diagram of graphs indicating variant values of positive external flipping load and negative internal flipping load relative to variant positions of deflection of the mutually connected spring systems of a toggle spring embodying the invention.

Fig. 9 is a central sectional view of another embodiment of the invention, employing two materials, preferably metals, and most preferably having thermostatic characteristics. Fig. 10 is a plan view of Fig. 9, as to one type thereof.

Fig. 11 is a plan view of Fig. 9, as to another type thereof.

Fig. 12 is a central sectional view of another embodiment of the invention, showing the employment of bi-metal for the rim. Fig. 13 is a central sectional view of another embodiment of the invention employing bi-metal for the rim, a variant type with respect to Fig. 12.

Fig. 14 is a plan view of another embodiment of the invention, employing bi-metal, and provided with electrical terminals. Fig. 15 is a plan view of another embodiment of the invention, employing bi-metal and provided with electrical terminals.

Fig. 16 is a central sectional view applicable to the types of embodiments of Figs. 14 and 15, illustrating a bi-metal toggle spring in opposing positions.

Referring to the drawings, and in particular to Figs. 1 through 3, a preferred type of toggle spring embodying the invention therein illustrated comprises an outer rim part 30, shown circular in configuration as to its outer periphery; in each of these embodiments the inward periphery of the rim part is substantially circular, at which are connected, preferably in symmetrical relation, two or more legged portions 31, in turn connected inwardly to a central zone part 32.

Usually, the variant types of toggle springs embodying the invention function to actuate an element, such as the indicated element 33 which may serve as a drive rod. In applications of use such element 33 may be a drive rod connecting the central zone of the toggle spring with electrical switch mechanisms, such as are illustrated and described in the below referred to applications, copending with my stated application, Serial No. 441,382, filed May 1, 1942, entitled "Toggle Springs," Serial No. 378,066, filed February 8, 1941, now abandoned, entitled Low Voltage Remotely Controllable Magnetically Actuated Switch, and its continuation application Serial No. 502,924, filed September 18, 1943, now U. S. Patent No. 2,450,924, granted October 12 1948, same title; Serial No. 434,313, filed March 12, 1942, entitled Overload Protected Electro-Magnetic Switch, now U. S. Patent No. 2,335,888, granted December 7, 1943, entitled Overload Protective Electro-Magnetic Switch; Serial No. 441,383, filed May 1, 1942, entitled Circuit Breaker and Overload Protective Device, now U. S. Patent No. 2,358,357, granted September 19, 1944, entitled Circuit Breaker and Overload Protective Device; Serial No. 445,851, filed June 5, 1942, now U. S. Patent No. 2,415,448, granted February 11 1947, entitled Remote Control Circuit Breaker with Overload Protection; and Serial No. 450,138, filed July 8, 1942, entitled Toggle Spring Actuating Means, now U. S. Patent No. 2,346,544, granted April 11, 1944, entitled Toggle Spring Actuating Means. In such and other applications of use, the central zone of the toggle spring may be provided with a recess, usually a perforated opening, see 34 Figs. 1, 2 and 3, through which one end, viz. the threaded end of the element 33 is passed and suitably secured to the toggle spring as by means of a nut 34a.

Usually, as is illustrated in the applications of use set forth in my aforesaid copending patent applications, the toggle spring may be located in position by engagement of its outer periphery, as in a circular or other suitable recess formed or arranged in a suitable housing in which are enclosed the toggle spring and a therewith associated assembly such as an electromagnetic coil.

Beryllium copper has yielded highly satisfactory test results as the material from which toggle springs embodying the invention have been formed. No. 2 rolled hard beryllium copper known as No. 125 made by the Beryllium Corporation, of Reading, Pennsylvania, has been successfully employed as the material for a large number of the variant types of toggle springs conforming to the invention, particularly in such instances of application wherein the favorable fatigue endurance characteristics of beryllium copper are of moment.

Among the physical variables of the material are the degree of hardness and the modulus of rigidity or elasticity, both of which are possessed to a high degree by beryllium copper. Structurally as to the toggle spring per se, is the factor of the relative strengths of the rim and of the arched inward part, particularly with respect to the legged center parts of the perforate types such as are illustrated in Figs. 2 and 3.

A further factor of toggle springs pursuant to the invention is the relation of the rim to the arched, i. e., bowed inward or legged center parts, conveniently expressed by the ratio $h/t$, see Fig. 5, $h$ indicating the height of the rim 30 and $t$ the thickness of the material. When the rim is dished to impart a frusto-conical configuration in a normal status of the toggle spring, $h$ is the axial dimension of such frusto-conical formation.

The value of $h/t$ is determinative in many types of toggle springs embodying the invention, in that as predicated upon test results when $h/t$ is greater than the square root of eight, i. e., 2.83, the toggle spring possesses two positions of stable equilibrium and when $h/t$ is positive but less than the square root of eight, i. e., 2.83, the toggle spring possesses but one position of stable equilibrium. The type of toggle spring when $h/t$ equals either precisely or approximately the square root of eight, i. e., 2.83, is discussed more fully hereinafter.

Indicating such values of $h/t$ graphically, see Fig. 6, abscissa values represent the extent of deflection and positive ordinate values represent energy input and negative ordinate values represent energy output. More specifically, the graph identified by $h/t > \sqrt{8}$ represents the values of energy input as to positive ordinates and of energy output as to negative values in relation to extent of deflection, the line F—F midway between the extreme points of intersection of the stated graph with the axis of abscissae, representing the fulcrum plane, explained more fully hereinafter. Corresponding values are shown by the graph identified by $h/t < \sqrt{8}$ and by the graph identified by $h/t = \sqrt{8}$.

Referred now to Fig. 7, and in further explanation of the graphs of Fig. 6, 35 represents generally a section of a toggle spring embodying the invention in normal status, i. e., in a position of stable equilibrium. 30 indicates its rim and 31 its inward, i. e., usually legged, center part in arched or bowed elastically relative to its rim. F—F represents the fulcrum plane passing through the outer periphery of the rim 30. Assuming the outer periphery of the rim to be held in more or less fixed position within the plane F—F and applying a force—indicated by the arrowed line L—at the central zone part of the toggle spring 35 in the direction of the indicated arrow, the inward part of the toggle spring 35 is displaced, accompanied by a turning movement of the rim about its fulcrum to an inverted position indicated by the short dash line 35a, the thus displaced position of the rim being indicated by 30a and that of the inward part by 31a. Continuation of such displacements by such force of the inward part and of the rim bodily and relatively effects an inside-out movement of the toggle spring, causing "flipping," whereupon the respective parts upon further displacement move toward and to the position indicated by the dash outline 35b.

In the instance of the toggle spring having two positions of stable equilibrium identified by the graph $h/t > \sqrt{8}$, Fig. 6, the position 35, Fig. 7, represents one position of stable equilibrium and the position 35b represents its other position of stable equilibrium.

In such "two position" type of toggle spring, the instant of "flipping" takes place at a time instant in advance of the inward part 35 attaining the fulcrum plane F—F, verified by the position 35a lying to the left of the line F—F, Fig. 7.

In the instance of a "single position" toggle spring having the characteristics represented by the graph $h/t < \sqrt{8}$, Fig. 6, the graph assumes the toggle spring at the point of intersection of the abscissa axis and the ordinate axis, to be in its single position of stable equilibrium, as represented at 35, Fig. 7. The values of the force, applied at the central zone of such type of toggle spring, required for moving the same through its "inside-out" displacement, as appears from its graph, its energy input rises from its position of stable equilibrium to a maximum, then decreases somewhat but within positive values, followed by an increase of force required to further deflect this type of toggle spring. Upon release of such force, this type of toggle spring returns to its original position of stable equilibrium, the energy discharged being indicated by its graph, in return direction.

In the instance of the toggle spring of the type having the characteristics represented by the graph identified in Fig. 6 by $h/t = \sqrt{8}$, the values of the force required to effect an "inside-out" movement, as indicated by its graph, rises similarly to a maximum, then decreases to substantially zero, whereafter the required force again increases. Upon release of such force, this type of toggle spring returns to its original position of stable equilibrium, the energy discharged being indicated by its graph, in return direction.

Fig. 8 illustrates in greater particulars the graph identified by $h/t > \sqrt{8}$ of Fig. 6, namely, a toggle spring of the type having two positions of stable equilibrium; and corresponding ordinate and abscissa values apply. A indicates one position of stable equilibrium and B its other position of stable equilibrium. The graph in solid outline, starting from A indicates by ordinate values the force required to effect the displacement toward the fulcrum plane F—F, of the inward part 31 and accompanying turning movement of the rim 30; the thus required force rises to a maximum indicated in value by the ordinate through the point C'. Succeeding this maximum stage, the force required for continued inside-out movement of the toggle spring decreases to the stage represented by the intersection of the solid outline graph with the abscissa axis, to wit, at point C, whereafter—as indicated by the continuation of the solid outline graph—the force becomes negative, that is to say, the potential energy, i. e., the energy input, progressively stored in the thus applied force is instantaneously converted into kinetic energy. This "snap" release of energy takes place at the point C in advance of the fulcrum plane indicated by the line F—F of Fig. 8. Toggle springs embodying the invention of the "two position" types accordingly possess positive "flipping" characteristics. The area bounded by the portion of the solid outline graph below the abscissa axis and by the abscissa axis represents the energy value discharged by the toggle spring at and after the instant of "flipping" until the toggle spring attains its second position of stable equilibrium, viz. point B.

The dash graph of Fig. 8, beginning at point B represents the corresponding values of applied force required to "flip" the toggle spring from its second position of equilibrium, B, to and through a maximum value, then through a stage of decreasing values until the point D is reached, whereat instantaneous discharge of stored potential energy into kinetic energy takes place, and corresponding actuation is effected by the toggle spring until it attains its first position of stable equilibrium, A.

The movements of the toggle spring indicated in Fig. 1 from one position to an opposing position, accompanied by corresponding actuation of the element 33, attached to its central zone portion 32, are indicated respectively by full section outline and dash section outline.

In certain instances of use, such as is set forth in my aforesaid copending application Serial No. 434,313, and in its aforesaid continuation application Serial No. 502,924, in a circuit breaker assembly, it is advantageous to limit the respective movements of the toggle spring. Thus the toggle spring may be restricted, say, adjacent its position A of stable equilibrium, at the point represented by C'', viz. when the circuit breaker is in its "off" position and/or at the point D'' adjacent its B position of equilibrium, viz. when the circuit breaker is in its "on" position, thus imparting to the circuit breaker at its respective positions immunity against vibrational acceleration due to external shocks, elimination of alternating current "hum," maintenance of good electrical conduct, etc.

The toggle spring illustrated in Fig. 9 is of two laminations of suitable material possessing characteristics as above set forth. Preferably, the materials are metallic, the laminae being in face-to-face engagement. Toggle springs of the multiple lamina type may have outer and inner configurations corresponding to the types illustrated in Figs. 2 and 3 with respect to single material. Thus the toggle spring illustrated in plan in Fig. 10 may be perforate to provide an inward part comprising four legged portions 31 connecting the central zone 32 with the rim 30. Fig. 11 shows in plan a multiple laminated toggle spring perforated to provide an inward part having three legged portions 31 and a central zone 32. The invention includes also toggle springs of multiple laminae having imperforate inward portions corresponding to the single material toggle spring shown in Fig. 4.

In general, toggle springs embodying multiple material are produced and possess the characteristics corresponding to single material toggle springs, as described hereinabove.

Toggle springs of bi-metal or other multiple metallic material of thermostatic characteristics may be operated, by employing heat, supplied radiantly or electrically or otherwise to generate the force or forces for "flipping" the same, effected by "inside-out" movement accompanied by instantaneous discharge of kinetic energy.

A toggle spring of the bi-metal or multiple metal type may be mounted for cooperation with associated parts by engagement of its outer periphery, similarly as described with respect to single material toggle springs referred to hereinabove, its opposed position being indicated in Figs. 9 and 16 in dot and dash outline.

For thermostatic control, bi-metal or multiple metal toggle springs are usually mounted upon a member attached to the central zone of the toggle spring as by means of a perforation or other recess, see 34, Figs. 9, 10, and 11.

Figs. 12 and 13 illustrate other embodiments of the invention wherein the rim is of bi-metal or other multiple laminated material and the inward part of single metal or other suitable material. In Fig. 12, the rim 30 is integral with the inward legged parts 31 and the second metal 36 or other suitable material is shown laminated upon the rim 30, namely on the normally convex side of the rim. In the embodiment shown in Fig. 13 the second metal 36 or other material is shown laminated on the normally concave side of the rim.

In my copending application Serial No. 434,313, and its said continuation application Serial No. 502,924, referred to hereinabove, the bi-metal toggle spring is employed as a shorting bar, in protection of overload or short-circuiting condition in the load circuit. For such purpose and in other applications of use, the bi-metal toggle spring having thermostatic characteristics, may be provided with contacts, see Fig. 14 wherein two contacts 37, 37 are provided; in such form of bi-metal thermostatic control element, the inward part is preferably of two legged or four legged arrangement, the latter being illustrated in Fig. 14.

Fig. 15 shows an embodiment of the invention of bi-metal toggle spring having thermostatic characteristics employing three contacts indicated at 37, 37, 37, and the toggle spring formed of three legged inward parts.

Fig. 16 illustrates in section a bi-metal thermostatic toggle spring of the type shown in Figs. 14 and 15, the heavy outline indicating the normal position of equilibrium of the toggle spring, the contacts 37, 37, being on the concave face thereof. The dot and dash outline of Fig. 16 indicates the retracted, i. e., "flipped," position of the toggle spring as in the circumstance of heating of the bi-metal above a predetermined temperature, such as under the condition of overload in a load circuit.

Bi-metal or other multiple laminated toggle springs embodying the invention may have two positions of equilibrium, also determined by its $h/t > \sqrt{8}$ or but one position of stable equilibrium as when its $h/t < \sqrt{8}$, similarly as in single metal or other material toggle springs set forth above, and similarly when its $h/t$ equals $\sqrt{8}$.

Usually, metallic toggle springs pursuant to the present invention are made of flat stock which is blanked and then formed to impart the desired geometrical and/or metallurgical characteristics effective in obtaining the mutually connected spring systems. Satisfactory results with the use of metal are attained, after blanking the flat stock, by treating the same in a suitable forming die conforming to the desired geometric configuration and imparting a coefficient of hardness to the outward or rim part with respect to that of the inward part.

Successful results in the production of metallic toggle springs having two positions of stable equilibrium have been had by striking on both sides of the rim portion of the metal, while precluding striking of the inward, i. e., usually "legged" center part, thereby imparting a dished formation to the theretofore flat rim part and causing the central or legged part to become bowed relative to the now-dished rim part. Such metallurgical treatment, per se, imparts to the rim part an increased coefficient of hardness, whereby the rim part possesses a coefficient of hardness greater than that of the unstruck central or legged part. The forming of the toggle spring of metal may also be carried out by striking the rim part and causing the rim part to be foreshortened at its outer circumference, thus also creating a bow or arch to the inward, i. e., usually "legged" center part, or by permitting the die to lengthen without permanently setting the inward, i. e., usually "legged" center part.

To produce a toggle spring having one position only of stable equilibrium, the metal may be struck on one side only in an appropriate forming die.

In the employment of non-metallic material, such as plastics, suitable for the production of toggle springs pursuant to the invention, the desired characteristics may be imparted to such material during the stage of molding or otherwise forming the material.

Generally speaking, dissimilar load-deflection attributes in the respective parts of the toggle spring impart the two or more mutually connected spring systems therein. Factors controlling such difference in load-deflection characteristics include the relative modulus of elasticity or rigidity of the rim with respect to the inward, i. e., usually "legged" center part, and the relative structural strength of the rim to the bowed inward, i. e., usually "legged" center part; the factors apparently controlling the force required to "flip" the toggle spring include the ratio of $w/t$ where $w$ is the width of the rim and $t$ is the thickness of the rim, and the ratio of $w/d$ where $w$ is the width of the rim and $d$ is the outer diameter of the toggle spring.

Insofar as test results now show, in a metal toggle spring the thickness of the material should be uniform and the range of thickness be from approximately .002 of an inch to approximately .030 of an inch; the height, as defined by "$h$" in the ratio $h/t$, should also be uniform for any given toggle spring.

Whereas I have described the invention by reference to specific forms thereof, it will be understood that many changes and modifications may be made provided they do not depart from the scope of the claims.

I claim:

1. The combination of a snap spring comprising a central part, a rim part having a greater coefficient of hardness than said central part and having its material shaped to frusto-conical configuration, and a part interconnecting said central part and said rim part, the material of said interconnecting part being bowed away from said rim part; means for mounting said snap spring at the periphery of its rim part; and an element connected to said central part of the snap spring, whereby upon flipping of the snap spring said element is actuated.

2. The combination of a snap spring comprising a central part, a rim part having its material shaped to frusto-conical configuration, and a part interconnecting said central part and said rim part, the material of said interconnecting part being bowed and having a coefficient of hardness less than that of said rim part; means for mounting said snap spring at the periphery of its rim part; and an element connected to said central part of the snap spring, whereby upon flipping of the snap spring said element is actuated.

3. The combination of a snap spring comprising a central part, a rim part having a greater co-efficient of hardness than said central part and having its material shaped to frusto-conical configuration, the value of the axial dimension of said frusto-conical rim part divided by the thickness of the material of said rim part being greater than the square root of eight, and a part interconnecting said central part and said rim part, the material of said interconnecting part being bowed away from said rim part; means for mounting said snap spring at the periphery of its rim part; and an element connected to said central part of the snap spring, whereby upon flipping of the snap spring said element is actuated.

4. The combination of a snap spring comprising a central part, a rim part having its material shaped to frusto-conical configuration, the value of the axial dimension of said frusto-conical rim part divided by the thickness of the material of said rim part being greater than the square root of eight, and a part interconnecting said central part and said rim part, the material of said interconnecting part being bowed and having a co-efficient of hardness less than that of said rim part; means for mounting said snap spring at the periphery of its rim part; and an element connected to said central part of the snap spring, whereby upon flipping of the snap spring said element is actuated.

5. The combination of a snap spring comprising a central part, a rim part having a greater co-efficient of hardness than said central part and having its material shaped to frusto-conical configuration, the value of the axial dimension of said frusto-conical rim part divided by the thickness of the material of said rim part being positive but less than the square root of eight, and a part interconnecting said central part and said rim part, the material of said interconnecting part being bowed away from said rim part; means for mounting said snap spring at the periphery of its rim part; and an element connected to said central part of the snap spring, whereby upon flipping of the snap spring said element is actuated.

6. The combination of a snap spring comprising a central part, a rim part having its material shaped to frusto-conical configuration, the value of the axial dimension of said frusto-conical rim part divided by the thickness of the material of said rim part being positive but less than the square root of eight, and a part interconnecting said central part and said rim part, the material of said interconnecting part being bowed and having a coefficient of hardness less than that of said rim part; means for mounting said snap spring at the periphery of its rim part; and an element connected to said central part of the snap spring, whereby upon flipping of the snap spring said element is actuated.

7. The combination of a snap spring comprising a central part, a rim part having a greater co-efficient of hardness than said central part and having its material shaped to frusto-conical configuration, the value of the axial dimension of said frusto-conical rim part divided by the thickness of the material of said rim part being greater than the square root of eight, and a part interconnecting said central part and said rim part, the material of said interconnecting part being bowed away from said rim part; means for mounting said snap spring at the periphery of its rim part; and an element connected to said central part of the snap spring, whereby upon flipping of the snap spring said element is actuated.

8. The combination of a snap spring comprising a central part, a rim part having a greater co-efficient of hardness than said central part and having its material shaped to frusto-conical configuration, the value of the axial dimension of said frusto-conical rim part divided by the thickness of the material of said rim part being positive but less than the square roof of eight, and a part interconnecting said central part and said rim part, the material of said interconnecting part being bowed away from said rim part; means for mounting said snap spring at the periphery of its rim part; and an element connected to said central part of the snap spring, whereby upon flipping of the snap spring said element is actuated.

9. The combination as defined in claim 2 in which the rim part only of said snap spring is formed of superposed plural metal parts.

10. The combination as defined in claim 2 in which the rim part only of said snap spring is formed of superposed plural metal parts of differential thermostatic characteristics.

11. The combination as defined in claim 2 in which the rim part only of said snap spring is formed of bi-metal parts, one of which is integral with said interconnecting part.

WILLIAM E. STILWELL, JR.

REFERENCES CITED

The following references are of record in the file of this patent:

UNITED STATES PATENTS

| Number | Name | Date |
| --- | --- | --- |
| 1,593,511 | Spencer | July 20, 1926 |
| 1,654,320 | Colby | Dec. 27, 1927 |
| 1,897,316 | Marshall | Feb. 14, 1933 |
| 1,939,286 | Spencer | Dec. 12, 1933 |
| 1,952,895 | Ross | Mar. 27, 1934 |

FOREIGN PATENTS

| Number | Country | Date |
| --- | --- | --- |
| 14,722 | France | Nov. 18, 1911 |
| 692,665 | Germany | June 24, 1940 |

OTHER REFERENCES

Handbook on Mechanical Springs—Their Engineering and Design—The William D. Gibson Co., Chicago, Ill. copyrighted 1944, pages 88, 90, 91. (Copy in Div. 45.)

Transactions of Amer. Soc. of Mech. Engineers, May 1936, vol. 58, pages 305–314, by Almen and Lazzlo. (Copy in Patent Office Library (TJ-1-A7).)